United States Patent [19]

Camacho Salvador L.

[11] Patent Number: 4,694,464
[45] Date of Patent: Sep. 15, 1987

[54] PLASMA ARC HEATING APPARATUS AND METHOD

[75] Inventor: Salvador L. Camacho, Raleigh, N.C.

[73] Assignee: Plasma Energy Corporation, Raleigh, N.C.

[21] Appl. No.: 892,081

[22] Filed: Jul. 30, 1986

[51] Int. Cl.$^4$ .......................... H05H 1/00; H05B 7/00
[52] U.S. Cl. ........................................ 373/22; 373/25
[58] Field of Search .................................. 373/18–25, 373/108; 219/121 PA, 121 PB, 121 PT

[56] References Cited

U.S. PATENT DOCUMENTS

| | | | |
|---|---|---|---|
| 3,147,329 | 9/1964 | Gage | 373/22 |
| 3,344,256 | 9/1967 | Anderson . | |
| 3,361,862 | 1/1968 | Sturrock et al. | 373/25 |
| 3,404,078 | 10/1968 | Goldberger . | |
| 3,429,691 | 2/1969 | McLaughlin . | |
| 4,119,828 | 10/1978 | Bykhovsky et al. . | |
| 4,143,260 | 3/1979 | Backstrom et al. . | |
| 4,341,915 | 7/1982 | Adachi et al. . | |
| 4,361,441 | 11/1982 | Tylko . | |
| 4,414,672 | 11/1983 | Paton et al. | 373/22 |
| 4,481,636 | 11/1984 | Curr et al. . | |

Primary Examiner—Roy N. Envall, Jr.
Attorney, Agent, or Firm—Bell, Seltzer, Park & Gibson

[57] ABSTRACT

An apparatus and method for heating a metallic melt with plasma torches is disclosed which is characterized by its ability to reduce the amount of contamination that is introduced into the metallic melt during the heating process. The apparatus and method includes a furnace chamber having a hearth for receiving a metallic melt. Mounted to the furnace chamber are a pair of plasma torches and an external electrode that is adapted to contact the metallic melt contained in the hearth. A separate direct current power supply is provided to operate such plasma torch. During operation of the apparatus, two separate circuits of opposite polarity are established through the metallic melt utilizing the plasma torches and the external electrode in contact with the melt. While these circuits are maintained, the external electrode is withdrawn from contact with the melt, thereby establishing a single series circuit which includes both plasma torches, both power supplies and the metallic melt.

8 Claims, 4 Drawing Figures

PLASMA ARC HEATING APPARATUS AND METHOD

BACKGROUND OF THE INVENTION

This invention relates to the heating of a metallic melt, and more particularly, to an apparatus and method for heating a metallic melt with plasma torches in which contamination of the metallic melt is reduced.

Apparatus for generating high voltage plasma arcs and methods for heating metallic material with such arcs have been known for some time. Typically, prior apparatus of this type include a hearth for receiving the metallic material, and a plasma arc torch mounted above the hearth for heating the metallic material. The arc generating circuit comprises a power supply for the plasma torch and an external electrode mounted in the hearth, such that when the circuit is in operation, current passes from the power supply to the plasma torch where an arc is generated that extends onto the metallic melt. The current from the arc then passes through the melt to the external electrode which is connected with the power supply to complete the circuit. Such apparatus and methods generate a large amount of heat in the metallic melt and have the advantage of quickly and efficiently heating and melting it. U.S. Pat. Nos. 3,749,803 and 3,779,182 are generally related to plasma arc heating systems of this type.

The above described apparatus and methods have a significant drawback in some applications, in that the molten material generated in the furnace is often contaminated by the external electrode. The external electrode is connected to the power supply at one of its poles and contacts the metallic melt at its other pole, remaining in contact with the metallic melt throughout the heating operation. Such electrodes are generally composed of graphite, i.e. carbon, and when the circuit is in operation, a large electrical current passes through the electrode, and the current and heat tends to break down the carbon in the electrode with the result that the electrode deteriorates. As the circuit is maintained and the melt turns molten, the electrode continues to deteriorate and the free carbon resulting from the deterioration contaminates the molten material. Such contamination reduces both the value and utility of the molten material and limits the number of applications for which plasma torch furnaces may be used.

It is an object of the present invention to overcome the disadvantages pointed out above in connection with known apparatus and methods of heating a metallic melt with plasma torches and to provide an apparatus and method for heating a metallic melt with plasma torches in which the contamination from the external electrode is effectively avoided. More particularly, it is an object of this invention to provide an apparatus and method of heating a metallic melt in which the external electrode is withdrawn from contact with the metallic melt and removed from the arc generating circuit in order that the current through the electrode can be discontinued so that the deterioration of the electrode is minimized and the contamination of the melt is reduced. The external electrode can be withdrawn from its contact with the metallic melt shortly after the requisite circuit is established with the result that the opportunity for contaminating deterioration of the electrode is substantially eliminated. Additionally, the reduced deterioration of the external electrode minimizes the frequency with which it must be replaced.

The apparatus and method of the present invention in its preferred embodiment is comprised of a furnace chamber having a hearth for receiving a metallic melt, and a pair of plasma torches each having a rear electrode. Both plasma torches are positioned to direct an arc onto the metallic melt in the hearth. An external electrode is mounted on the furnace chamber and is movable between a position in contact with the metallic melt and a position withdrawn from contact with the metallic melt. A first direct current power supply is mounted externally of the furnace chamber and is connected between one of the plasma torches and the external electrode with its anode connected to the rear electrode of such plasma torch and its cathode connected to the external electrode. A second direct current power supply is mounted externally of the furnace chamber and is connected between the other plasma torch and the external electrode with its cathode connected to the rear electrode of such plasma torch and its anode connected to the external electrode.

During the operation of the present invention, two series circuits of opposite polarity are established, each circuit containing one of the plasma torches, one of the power supplies, the metallic melt and the external electrode. The external electrode is then withdrawn from both circuits, thereby establishing a single circuit containing both plasma torches, both power supplies and the metallic melt.

Other advantages and a fuller understanding of the invention will be had from the following detailed description when taken in conjunction with the accompanying drawings.

DESCRIPTION OF THE ILLUSTRATED EMBODIMENT

Figure 1:
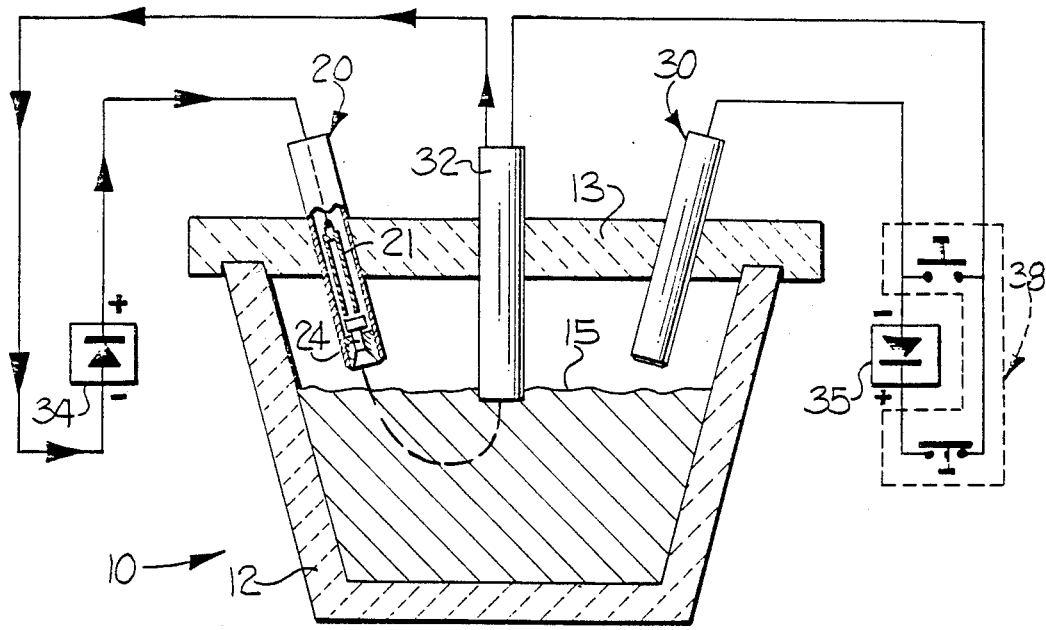
FIG. 1 is a schematic side elevation view showing an embodiment of the present invention, with a first circuit established through one of said plasma torches, one power supply, the metallic melt and the external electrode.
Figure 2:
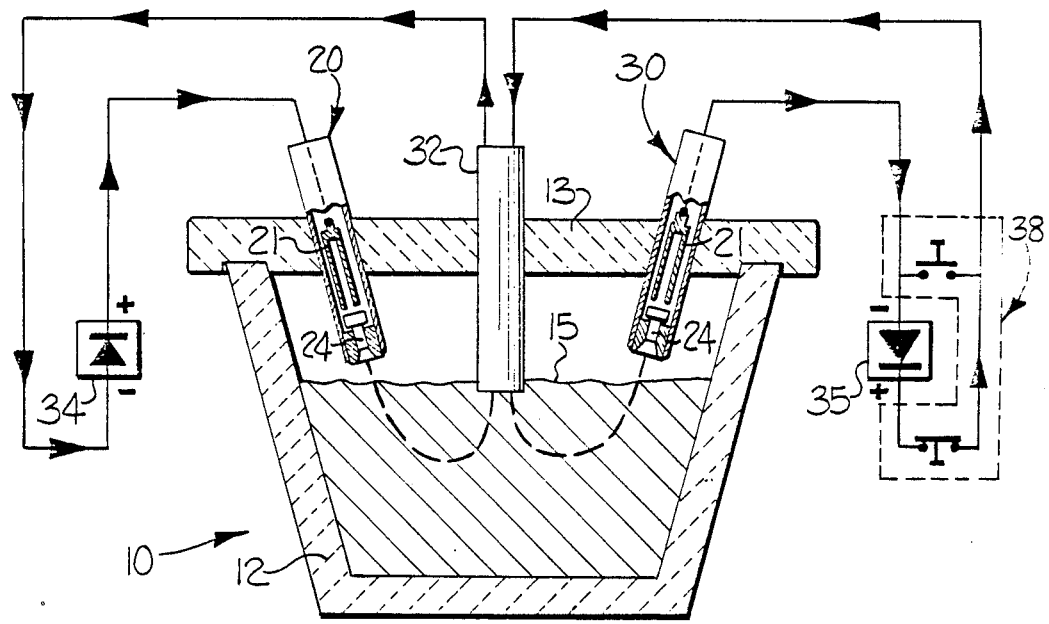
FIG. 2 is a similar view showing the present invention with a second circuit established through the other plasma torch, a second power supply, the metallic melt and the external electrode.
Figure 3:
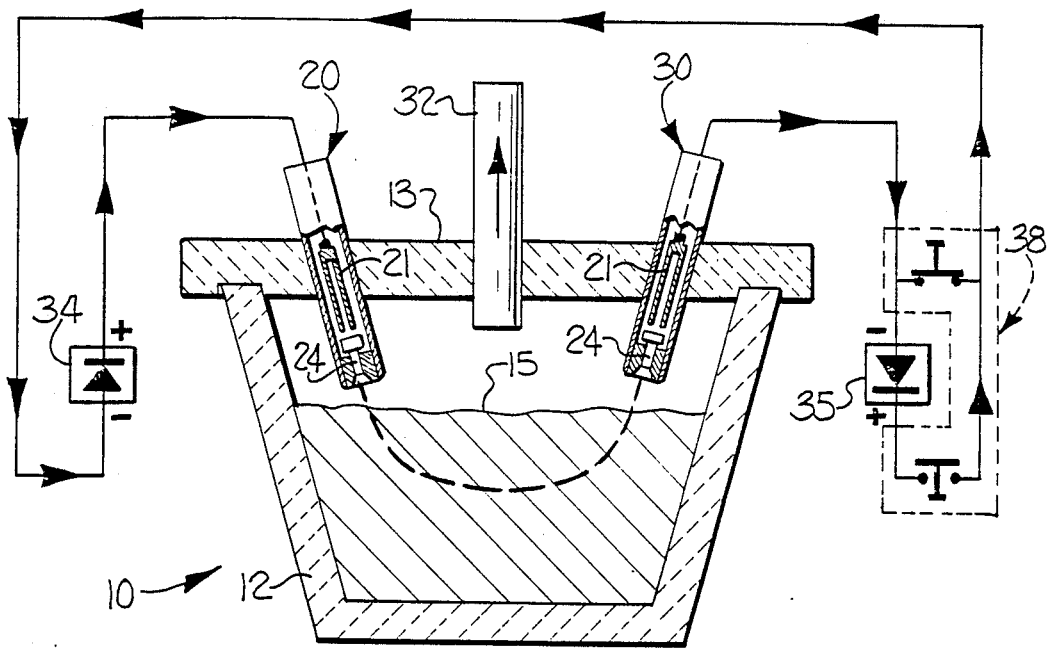
FIG. 3 is a similar view showing the present invention with the external electrode withdrawn and a single circuit established through the plasma torches, two direct current power supplies and the metallic melt.

As seen in FIG. 1, 2 and 3, the apparatus and method of the present invention includes a furnace chamber 10 having a ladle 12 which defines a hearth for receiving a metallic melt 15. The furnace chamber is comprised of bottom and side walls constructed of a refractory lined material and suitable for use with the high temperatures required to melt the particular metallic material placed in the hearth, such as steel. A removable cover 13 overlies the ladle, and the cover may be removed to permit introduction of the metallic material to be melted, and subsequent draining of the melted metallic material upon tilting of the ladle.

Figure 4:
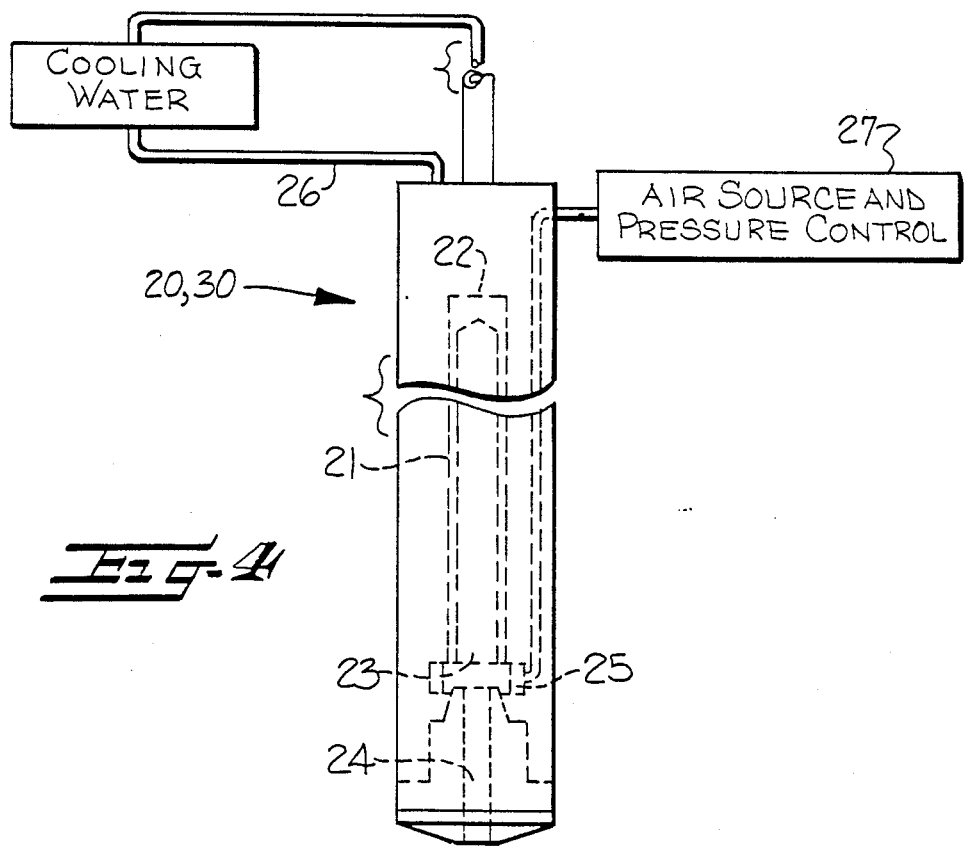
FIG. 4 is a schematic side elevation view of one of said plasma torches of the present invention.

As indicated by reference characters 20 and 30, a pair of plasma torches are mounted in the cover 13 of the furnace chamber. Each plasma torch is mounted to the cover in such a way that the arc produced by the plasma torches may be directed onto different points of the metallic melt contained in the hearth so as to facilitate the optimum flow of current through the metallic melt when the present invention is in operation as herein further described below. The constructional details of the torch 20 are illustrated in FIG. 4, it being understood that the torch 30 is of identical construction. In particular, the torch 20 includes a tubular rear electrode 21 having a closed inner end 22 and an open outer end 23. A collimating nozzle 24 is mounted adjacent but spaced from the rear electrode, with the collimating nozzle including a central bore which is axially aligned with the rear electrode. Further, the torch includes vortex generating means 25 for generating a vortical flow of gas at a location intermediate the rear electrode and the nozzle.

The plasma arc torch 20 also includes internal coolant flow path means 26 whereby the heat absorbed by the rear electrode and the nozzle may be withdrawn, and an air supply system 27 for delivering air to the vortex generator. Further details regarding the internal structure and operation of the torch 20 may be obtained from the present inventor's prior U.S. Pat. Nos. 3,673,375; 3,818,174, and 4,549,065, the disclosures of which are expressly incorporated by reference.

The apparatus and method of the present invention also includes an external electrode 32. The external electrode is typically constructed of graphite and, until a series circuit is established through both plasma torches as herein further described below, is indirectly connected to the rear electrode of each plasma torch. The external electrode is mounted to the furnace chamber in such a way as to be vertically movable between a position in contact with the metallic melt (FIGS. 1 and 2) and a position withdrawn from contact with the metallic melt (FIG. 3).

A first direct current power supply 34 is provided, which is mounted externally of the furnace chamber. The power supply 34 includes an anode connected to the rear electrode 21 of the torch 20 and a cathode connected to the external electrode 32. A second direct current power supply 35, is also provided, which has its cathode connected to the rear electrode of the torch 30 and its anode connected to the electrode 32. In addition, a by-pass switch 38, illustrated by the dotted lines in FIGS. 1, 2 and 3, is included in the second circuit, for selectively disconnecting the second power supply for the purposes described herein below.

Now referring more specifically to FIG. 1, the first step in the utilization of the present apparatus and method will be further described. As illustrated, the external electrode 32 is moved into a position where its lower pole contacts the metallic melt 15. With the first power supply 34 on, the plasma torch 20 is energized and thereby generates a plasma arc column which extends from its rear electrode 21, though the vortex generator 25 and nozzle 24, and to the metallic melt 15. The arc creates a current through the metallic melt as indicated by the dashed line, which passes through the external electrode 32 and returns to the first power supply 34, thereby establishing a circuit that will continue until the first power supply is turned off. The components of the above described circuit have the polarity indicated in FIG. 1 and the current flows in the direction indicated by the arrows.

Now, referring to FIG. 2, the second step in the utilization of the present apparatus and method will be described. With the first circuit described above maintained, and the external electrode in contact with the metallic melt, the plasma torch 30 is energized by the second power supply 35 so as to generate a plasma arc column which extends forwardly onto the metallic melt 15. The arc creates a second current through the metallic melt that has an opposite polarity from the first circuit. The second current is indicated by the dashed line in FIG. 2. The current flows into the melt from the external electrode and flows from the melt to the rear electrode of the plasma torch 30. From the plasma torch, the current passes to the second power supply 35 that is connected to the external electrode and thereby completes a second circuit. The flow of current through the circuit will continue in the direction indicated by the arrows in FIG. 2 until the second power supply is cut off. The components of the above described circuit have the polarity indicated in FIG. 2.

FIG. 3 illustrates the third step in the utilization of the present apparatus and method. With both circuits hereinabove described maintained at substantially the same current levels, the external electrode 32 is withdrawn from contact with the melt. When the external electrode is withdrawn, the first current flowing from plasma torch 20 passes through the metallic melt and to plasma torch 30 which has the opposite polarity of plasma torch 20. The second current flowing through the melt from the external electrode 32 to the plasma torch 30, combines with the first current and also flows from plasma torch 20, through the melt, to plasma torch 30. As such, with the external electrode withdrawn, a single circuit through the metallic melt is established which utilizes both plasma torches and both power supplies. If desired, the external electrode 32 may then be separated from the resulting single circuit, as schematically indicated in FIG. 3.

Once a single operating circuit is established, the switch 38 may be reversed as shown in FIG. 3, so that the second power supply 35 is removed from the circuit. Thus, operation may continue with only the first power supply 34 in operation. This provides an advantage in that the second power supply may be of a lesser capacity, thus reducing the cost of the overall system and improving operational efficiency.

As will be apparent from the above description, the above described utilization of the present invention facilitates the use of plasma torches in heating a metallic melt. Inasmuch as the steps disclosed herein can be performed in rapid succession, the length of time that the external electrode 32 remains a part of either the first or second circuit is minimized, thus reducing the deterioration of the external electrode as well as the carbon contamination introduced into the metallic melt as it turns molten.

It will also be apparent to those skilled in the art that certain embodiments of the present invention may provide for automatic operation. More particularly, control means may be incorporated that monitor the current flow through the metallic melt and signal other means that withdraw the external electrode from its contact with the metallic melt. Such control means may signal still other means that automatically disconnect one of said power supplies from the appropriate plasma torch. The output of the various control means may be fed into a microprocessor or other computer that evaluates the signal and engages the proper response. Such automatic operation has the obvious advantage of eliminating human error in the heating operation and thereby, further facilitating the efficiency and utility of the operation as a whole.

In the drawings and specification, there has been set forth preferred embodiments of the invention, although specific terms are employed, they are used in a generic and descriptive sense only and not for purpose of unduly limiting the scope of the present invention, which scope is defined by the appended claims.

That which is claimed is:

1. An apparatus for heating a metallic melt which is adaptable to efficient starting and operation and comprising:
   a furnace chamber having a hearth for receiving a metallic melt and the like;
   a pair of plasma torches mounted to said furnace chamber for initiating and sustaining a plasma arc, each plasma torch including a rear electrode;
   an external electrode mounted to said furnace chamber so as to be adapted to contact the metallic melt in the hearth;
   a first direct current power supply means mounted externally of said furnace chamber and having an anode connected to said rear electrode of one of said plasma torches and a cathode connected to said external electrode, and such that a first circuit may be established between said first power supply means, said one plasma torch, the metallic melt, and said external electrode; and
   a second direct current power supply means mounted externally of said furnace chamber and having a cathode connected to said rear electrode of the other of said plasma torches and an anode connected to said external electrode, and such that a second circuit may be established between said second power supply means, said other plasma torch, the metallic melt, and said external electrode, and with the second circuit having a polarity opposite to that of said first circuit;
   means for selectively removing said external electrode from each of said first and second circuits and establishing a single operating circuit which includes in series said first and second power supply means, said pair of torches, and the metallic melt which serves to conduct current between said pair of torches.

2. An apparatus according to claim 1 additionally comprising means mounted to said furnace chamber for moving said external electrode between a position in contact with the metallic melt and a position withdrawn from contact with the metallic melt.

3. An apparatus according to claim 1 additionally comprising means connected to one of said direct current power supply means for disconnecting said one direct current power supply means from its associated plasma torch, and such that both of said pair of torches are adapted to be powered by the other of said direct current power supply means when said single operating circuit is established.

4. An apparatus according to claim 3 wherein said other of said direct current power supply means has a power capacity sufficient to operate both of said plasma torches.

5. An apparatus according to claim 1 further comprising a removable cover overlying said furnace chamber above said hearth, and wherein said pair of plasma torches and said external electrode are mounted to said cover.

6. A method of starting and operating a furnace comprising a furnace chamber having a hearth for receiving a metallic melt, a pair of plasma torches mounted to said furnace chamber each including a rear electrode, an external electrode mounted to said furnace chamber and adapted to contact the metallic melt, and first and second direct current power supply means with one of said power supply means having an anode connected to the rear electrode of one of said plasma torches, and the other having a cathode connected to the rear electrode of the other of said plasma torches, and including the steps of:
   establishing a first electrical circuit through the metallic melt, said external electrode in contact with the metallic melt, one of said direct current power supply means, and one of said plasma torches,
   establishing a second electrical circuit of opposite polarity through the metallic melt, said external electrode in contact with the metallic melt, the other of said direct current power supply means and the other plasma torch,
   removing the separate electrode from the first and second circuits and establishing a single operating circuit with the pair of plasma torches being connected therein and with the current being conducted through the melt and between the plasma torches.

7. A method according to claim 6 wherein the step of removing the separate electrode includes withdrawing the external electrode from contact with the metallic melt.

8. A method according to claim 6 including the additional step of disconnecting one of said direct current supply means after the single operating circuit is established.

* * * * *